(12) United States Patent
Chen et al.

(10) Patent No.: US 9,456,127 B2
(45) Date of Patent: Sep. 27, 2016

(54) BLUR DETECTION METHOD OF IMAGES, MONITORING DEVICE, AND MONITORING SYSTEM

(71) Applicant: VIVOTEK INC., New Taipei (TW)

(72) Inventors: Chih-Wei Chen, New Taipei (TW); Ming-Feng Yang, New Taipei (TW); Chieh-Jen Lee, New Taipei (TW); Li-Shan Shih, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 14/828,530

(22) Filed: Aug. 18, 2015

(65) Prior Publication Data

US 2016/0057338 A1    Feb. 25, 2016

(30) Foreign Application Priority Data

Aug. 19, 2014    (TW) .............................. 103128469 A

(51) Int. Cl.
*H04N 5/232*    (2006.01)

(52) U.S. Cl.
CPC ................................ *H04N 5/23212* (2013.01)

(58) Field of Classification Search
CPC ................................................... H04N 5/23212
USPC ......................................................... 348/345
See application file for complete search history.

(56) References Cited

FOREIGN PATENT DOCUMENTS

TW    I343745    6/2011

*Primary Examiner* — Usman Khan
(74) *Attorney, Agent, or Firm* — Winston Hsu; Scott Margo

(57) ABSTRACT

A monitoring device, system, and blur detection method of images separate a monitored area into an in-focus area and an out-of-focus area after focusing is done and then analyze the following captured images for how the blocks that makes up the in-focus area change in the blurriness and the proportion of the blocks with changed blurriness to overall blocks in the in-focus area. When the proportion of a captured image meets a specific condition, the captured image is then determined as a blur image. A consecutive number of determined blur images will trigger an auto focus procedure.

13 Claims, 4 Drawing Sheets

BLUR DETECTION METHOD OF IMAGES, MONITORING DEVICE, AND MONITORING SYSTEM

BACKGROUND OF THE INVENTION

1. Field of the Invention

The invention relates to a blur detection method of images, a monitoring device, and a monitoring system, and more particularly, to a method, a monitoring device, and a monitoring system that can determining whether an image is blurred according to the proportion of blur changes in an originally in-focus area of the image and carry out follow-up specific action.

2. Description of the Prior Art

As an effective image acquiring tool of a monitored scene, a monitoring device or a monitoring system is equipped with camera with the ability of auto-focus, panning, tilting, and zooming, so that clear images from some specific spots or the entire monitored scene may be obtained when the camera is correctly auto-focused.

Most monitoring devices in the market use auto-focus mode to do the focus job on the monitored scene, by which a focus motor that controls the focus status of the lens inside the monitoring device will selectively operate according to the current focus status of the scene and to change the focus length of the lens to acquire clear monitored images. However, it is a common case that some persons or objects of no interest may temporarily show up in the monitored scene, whose movements are the cause of frequent focusing of the monitoring device. As a result, the time of use of the focus motor increases, making the focus motor faster to age and the focus behavior will be overly interrupted by irrelevant events that there is highly chance to lose clear images of the monitored position/object.

SUMMARY OF THE INVENTION

The invention provides a blur detection method of images that are empirically applicable on auto focusing control of a monitoring device or a monitoring system to solve the above problems.

According to the embodiments of the invention, a blur detection method of images is provided and includes following steps: generating a reference image having a plurality of blocks; identifying a plurality of first blocks from the plurality of blocks, wherein an in-focus area is defined by the plurality of first blocks; generating a test image having a plurality of test blocks corresponding to the plurality of blocks of the reference image; identifying a plurality of second blocks from the plurality of test blocks that correspond to the plurality of first blocks in the in-focus area; and executing a determination procedure and generating a determination result based on information from the plurality of second blocks and the plurality of first blocks, and when the determination result meets a predetermined condition, determining the test image as a blurred image.

In another embodiment of the invention, a monitoring device is provided to include an image capturing unit and a processing unit. The image capturing unit and the processing unit perform the above blur detection method.

In still another embodiment of the invention, a monitoring system is provided to include a monitoring device having an image capturing unit and a first processing unit and to include a remote processing device having a second processing unit. The monitoring device and the remote processing device perform the above blur detection method.

The monitoring device, the monitoring system, and the blur detection method start the auto-focus procedure only when a previously recognized in-focus area becomes blurred to a certain degree, which meets the use experience and is also capable of reducing aging of elements caused by constant focusing and instability of sharpness of images.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 1:
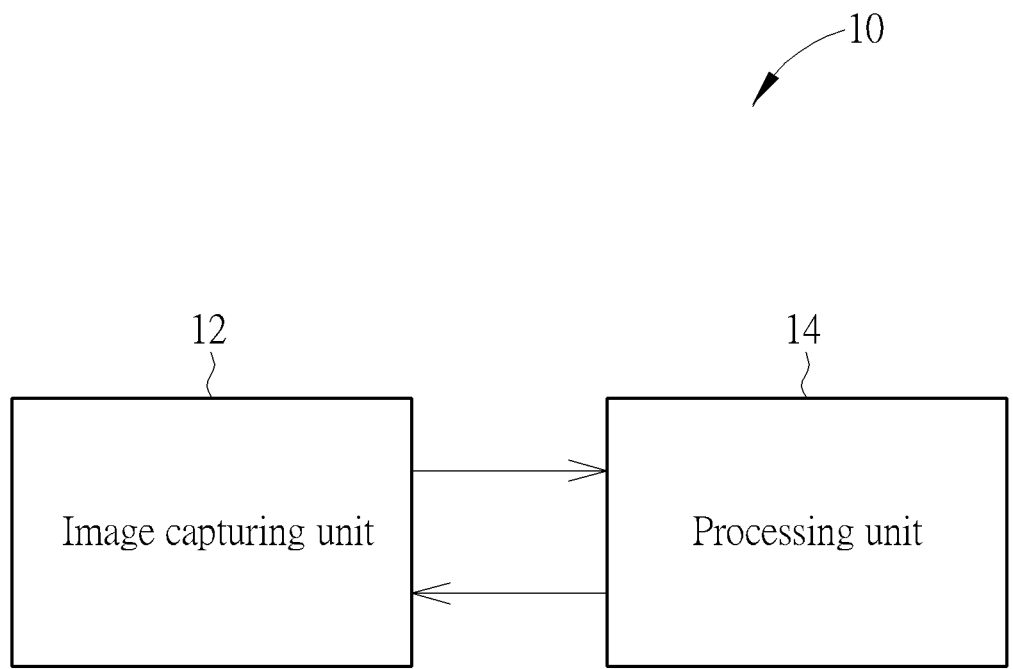
FIG. 1 is a schematic diagram of a monitoring device according to the invention.

Please refer to FIG. 1. FIG. 1 is a schematic diagram of a monitoring device according to the invention. A monitoring device 10 includes an image capturing unit 12 and a processing unit 14. The image capturing unit 12 may be a camera, with capability of panning, tilting, and zooming, to monitor and capture a certain scene and send the captured images to the processing unit 14.

Figure 2:
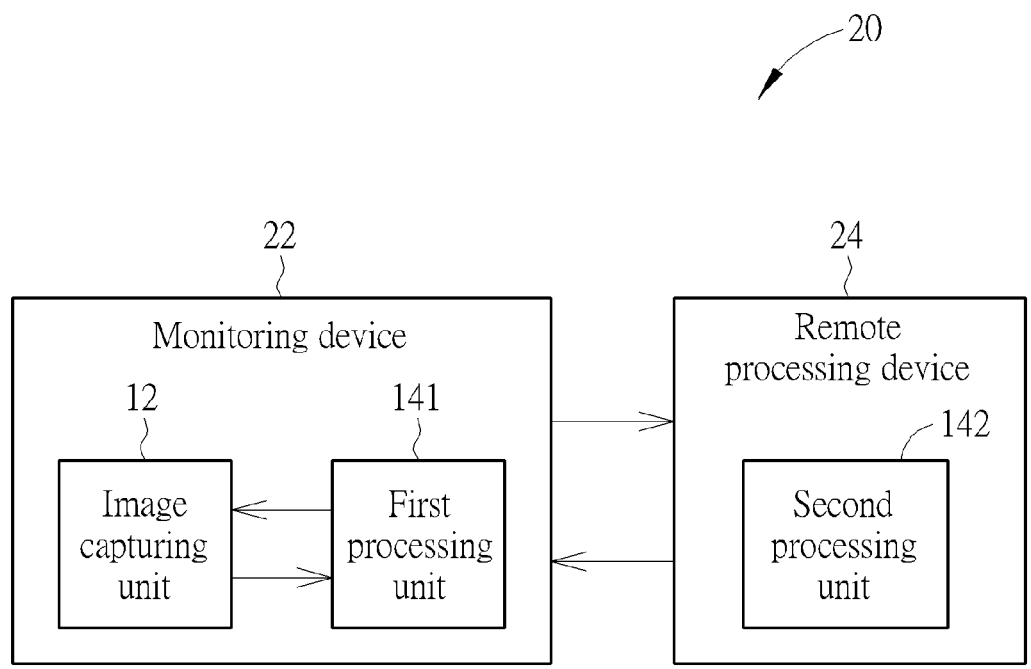
FIG. 2 is a schematic diagram of a monitoring system according to the invention.

Please refer to FIG. 2. FIG. 2 is a schematic diagram of a monitoring system according to the invention. A monitoring system 20 includes a monitoring device 22 and a remote processing device 24. The monitoring device 22 has an image capturing unit 12 and a first processing unit 141. The remote processing device 24 can be deployed in a relatively remote location a certain distance from the monitoring device 22, which means that the remote processing device 24 and the monitoring device 24 can be two distinct apparatuses and the remote processing device 24 is located remotely from the monitored scene where the monitoring device 22 is located. The remote processing device 24 includes a second processing unit 142. When the image capturing unit 12 of the monitoring device 22 monitors and captures a certain scene, either all the captured images can be sent back to the remote processing device 24 for the second processing unit 142 for image processing and blur determination or part of the job can be carried out by the first processing unit 141 of the monitoring device 22 and part of the job carried out by the second processing unit 142. The processing, determination, and responding procedure made to the images by the processing units (the processing unit 14 in FIG. 1 or the first processing unit 141 and the second processing unit 142 is FIG. 2) will be stated with the blur detection method of the invention in the following paragraphs.

Figure 3:
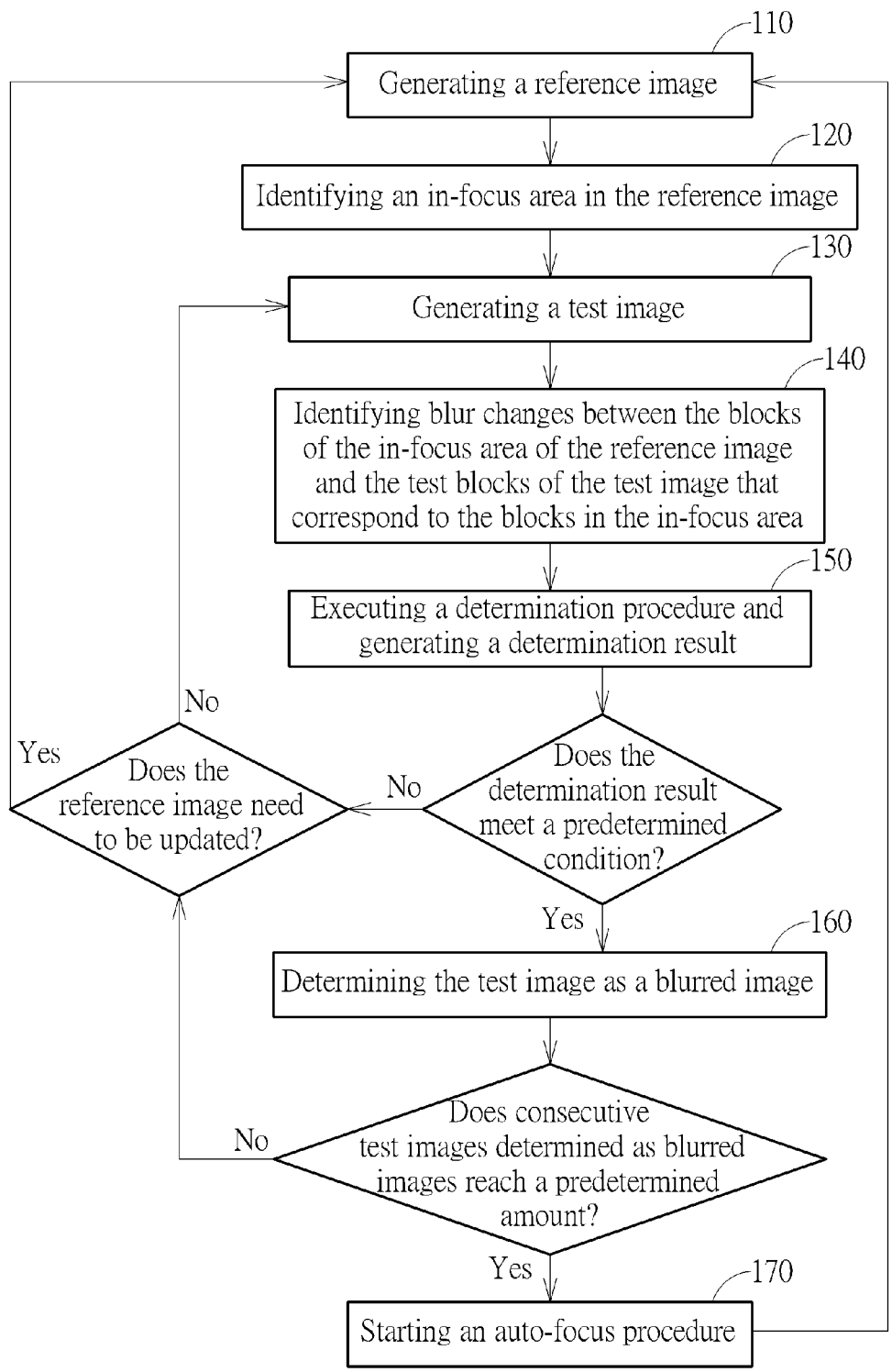
FIG. 3 is a schematic diagram showing a flow chart of a blur detection method according to the invention.

Please refer to FIG. 3. FIG. 3 is a schematic diagram showing a flow chart of a blur detection method according to the invention. A blur detection method 100 includes following steps:

Step 110: generating a reference image having a plurality of blocks;

Step 120: identifying a plurality of first blocks from the plurality of blocks, wherein an in-focus area is defined by the plurality of first blocks;

Step 130: generating a test image having a plurality of test blocks;

Step 140: identifying blur changes between the blocks of the in-focus area of the reference image and the test blocks of the test image that correspond to the blocks in the in-focus area;

Step 150: executing a determination procedure according to the information in Step 140 and generating a determination result accordingly;

Step 160: determining the test image as a blurred image; and

Step 170: when consecutive plurality of test images are determined as blurred images and the number of blurred images reach a predetermined amount, starting an auto-focus procedure and then performing Step 110 for generation of a new reference image.

Figure 4:
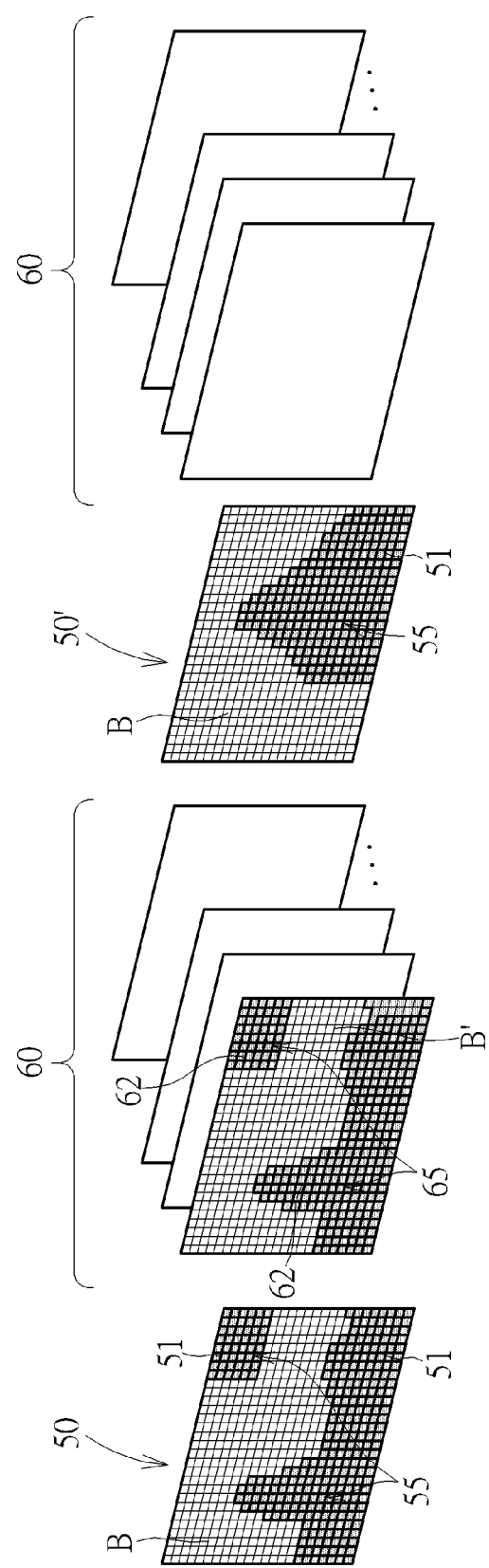
FIG. 4 is a schematic diagram showing images captured and analyzed with the blur detection method of the invention.

Please also refer to FIG. 4 together with FIG. 3. FIG. 4 is a schematic diagram showing images captured and analyzed with the blur detection method of the invention. The blur detection method of the invention categorizes images as blur images by referring to the proportion of blocks that are changed to blurry ones, and decides whether to refocus according to the number of consecutive occurrence of the blur images, or the occurring time of the blur images, so as to control the focus function of a monitoring device or a monitoring system. In Step 110, when the monitoring device 10 or the monitoring system 20 is in an initialized status or after they are refocused by the auto-focus procedure in Step 170, using an image capturing unit 12 to capture a plurality of images from a scene, the processing unit 14 or the second processing unit 142 processes part of the captured images and generates a reference image 50 accordingly. In more detail, the reference image 50 can be an image generated by using the information: the focus, the contrast, or the color info . . . of each of the plurality of images captured by the image capturing unit 12 and image-processing them by averaging them or taking the median of them. In other embodiments, the reference image 50 can be simply the first image of the plurality of images captured by the image capturing unit 12. The test image 60 generated in Step 130 can be an image generated by image-processing the plurality of images captured by the image capturing unit 12, after the images that are used to generate the reference image 50, by the processing unit 14 (or the second processing unit 142). The test image 60 can also be the first of the plurality of images captured by the image capturing unit 12 after the images that are used to generate the reference image 50. The reference image 50 includes a plurality of blocks B, whereas the test image 60 also includes a plurality of test blocks B' corresponding one-by-one to the blocks B of the reference image 50. The size of these blocks B and test blocks B' can be as small as a pixel, each block B or test block B' taking up the length and the width of a pixel, or can be some sort of system default setting or with user defined length and width.

Given that the reference image 50 in Step 110 comes from focused images, either initially focused or refocused, the processing unit 14 or the second processing unit 142 is able to identify a plurality of first blocks 51, which is determined as clear blocks, from the plurality blocks B in the reference image 50. More specifically, the processing unit 14 identifies a block B as the first block 51 by checking if a certain attribute of the block B exceeds a first threshold value . For example, the contrast value of a block B exceeding the first threshold value renders the block B as a first block 51, which is a clear block. It should be noted that the first threshold value can be preset dynamically by averaging, normalizing, or weighting all the contrast values of the blocks from the generated reference image 50, which means a new first threshold value comes with every reference image 50. In other embodiment, the first threshold value may also be set by a specific value directly or set with specific value that comes with different default scenarios such as the night scene, the indoor scene, the outdoor scene, etc.

The set of the first blocks 51, i.e., all the blocks B whose contrast values are larger than the first threshold value, defines an in-focus area 55, and the in-focus area 55 of the reference image 50 may include one or more continuous or non-continuous regions of non-specific contours and each and every block B within the(se) region(s) is known as the first block 51 identified by the processing unit 14. It should be noted that other than the relatively clear areas or in-focus areas as stated above, the in-focus area 55 can also be recognized specifically by a user to be areas of interest in other embodiments. In some embodiments, the processing unit 14 or the second processing unit 142 identifies the first blocks 51 of the reference image 50 (Step 120) after the generation of the reference image 50 (Step 110) and the test image 60 (Step 130), or the generation of the test image 60 (Step 130) takes place after the generation and identification of the reference image (Step 110, 120). Hence, Step 120 and Step 130 are interchangeable in the invention.

A basis for comparison toward the follow-up test image 60 is established on the completion of generation and identification of the reference image 50. In Step 140, test blocks B' in an in-focus area 65 of the test image 60, corresponding to the in-focus area 55 of the reference image 50, will be identified. Likewise, the contrast values of the test blocks B' within the in-focus area 65 are used as comparison data for identifying from the test blocks B' a plurality of second blocks 62. Two ways are available for identification of the second blocks 62. In one way, those test blocks B' with change of contrast values will be identified as the second blocks 62, which in other words, by comparing the contrast value of each of the plurality of first blocks 51 of the reference image 50 and the contrast value of each corresponding test block B' of the plurality of test blocks B' that correspond to the plurality of first blocks 51 in the in-focus area 65, identify a plurality of test blocks B' that correspond to the plurality of first blocks 51 in the in-focus area 65 and have different contrast values as the plurality of second blocks 62. These second blocks 62 identified can be regarded as blocks turning from clear ones to blurred ones.

In another way, those test blocks B' without change of contrast values will be identified as the second blocks 62, which in other words, by comparing the contrast value of each of the plurality of first blocks 51 of the reference image 50 and the contrast value of each corresponding test block B' of the plurality of test blocks B' that correspond to the plurality of first blocks 51 in the in-focus area 65, identify a plurality of test blocks B' that correspond to the plurality of first blocks 51 in the in-focus area 65 and have substantially the same contrast values as the plurality of second blocks 62. These second blocks 62 identified can be regarded as blocks that remain clear in the test image 60. This way is also provided in FIG. 4 as illustration.

When the second blocks 62 are identified from the test image 60, a determination procedure is then carried out in Step 150 based on the information from Step 140 and a determination result is generated accordingly. More specifically, the monitoring device, the monitoring system, and the blur detection method provided in the invention determine whether a test image 60 after the reference image 50 is becoming a blur one based on the information of Step 140. If the first way of identification of the second blocks 62, i.e., the second blocks 62 being those test blocks B' with changes of contrast values (becoming blurred), then for one embodiment, given the fact that the number of the plurality of first blocks 51 is M and the number of the plurality of second blocks 62 is N, the determination procedure in Step 150 is 'dividing N by M' and the determination result is 'a ratio of N divided by M'. It can be learned that M and N are positive integers (or N may be 0 as well) and the ratio of N divided by M denotes the proportion of test blocks B' in the in-focus area 65 of the test image 60 that turn blurred, as far as the same area (the in-focus area 55 of the reference image 50 and the in-focus area 65 of the test image 60) is concerned.

With the determination result in Step 150, a predetermined condition is used to check if the determination result is qualified for executing the following Step 160, to determine the test image 60 as a blurred image. More specifically, if the ratio (N/M) is greater or equal to a second threshold value, i.e., the numbers of the test blocks B' in the in-focus area 65 turning into blurred ones is greater than a certain proportion, the test image 60 is certified to be determined as a blurred image. For the embodiments of the invention, the second threshold value is set preferably to be 50%, when greater or equal to 50% of the test blocks B' in the in-focus area 65 of the test image 60 are identified to be the second blocks 62, it indicates that at least half of the area, or the area of interest, that was clear now becomes blurred and determination as a blurred image will be made to the test image 60.

If the second way of identification of the second blocks 62, i.e., the second blocks 62 being those test blocks B' without changes of contrast values (substantially the same as the first blocks 51), then for another embodiment, given the fact that the number of the plurality of first blocks 51 is M and the number of the plurality of second blocks 62 is N, the determination procedure in Step 150 is 'dividing N by M' and the determination result is 'a ratio of N divided by M'. It can be learned that M and N are positive integers (or N may be 0 as well) and the ratio of N divided by M denotes the proportion of test blocks B' in the in-focus area 65 of the test image 60 that remain clear, as far as the same area (the in-focus area 55 of the reference image 50 and the in-focus area 65 of the test image 60) is concerned.

With the determination result in Step 150, a predetermined condition is used to check if the determination result is qualified for executing the following Step 160, to determine the test image 60 as a blurred image. More specifically, if the ratio (N/M) is smaller or equal to a third threshold value, i.e., the numbers of the test blocks B' in the in-focus area 65 remaining clear ones is smaller than a certain proportion, the test image 60 is certified to be determined as a blurred image. For the embodiments of the invention, the third threshold value is set preferably to be 80%, when less than or equal to 80% of the test blocks B' in the in-focus area 65 of the test image 60 are identified to be the second blocks 62, it indicates that less than or equal to 80% of the area, or the area of interest, remains clear and determination as a blurred image will be made to the test image 60.

Besides what Step 150 and Step 160 have revealed, the determination procedure executed and the determination result generated by analyzing changes of contrast values between each individual block B and each individual test block B' of the corresponding in-focus areas 55, 65 of the reference image 50 and the test image 60, the determination procedure may also be programmed to be 'dividing the average of contrast values of all test blocks B' in the in-focus area 65 of the test image 60 by the average of contrast values of all first blocks 51 in the in-focus area 55 of the reference image 50', and the determination result comes with such procedure and is the result of the divisor formula. When the ratio, the determination result, from the determination procedure is larger (or smaller) than a predetermined value, the test image 60 is then determined as a blurred image. It should also be noted that noise reduction and brightness adjustment may be applied by the processing unit 14 or the image capturing unit 12 to the images captured by the image captured unit 12 in advance, before Step 110 and the following steps are carried out.

While one test image 60 is discussed for now as in the blur determination with regard to the reference image 50, the image capturing unit 12, as a matter of fact, keeps capturing images from a scene when the monitoring device 10 works and the processing unit 14 or the image capturing unit 12 generates repeatedly a plurality of test images 60 accordingly. As each test image 60 individually goes through blur determination procedure as in Step 130-160, there might be a change of scene or a displacement of the monitoring device 10 that causes these test images 60 to be determined as blurred images. In the invention, an auto-focus procedure will start when the in-focus area 55 has turned blurred, at least partially, for a period of time, i.e., the test images 60 are determined consecutively as blurred images. For example, when consecutive P test images are determined as blurred images, P as integer larger than 1, preset by system or decided by the user, the processing unit 14 starts the auto-focus procedure as in Step 170 and the image capturing unit 12 refocuses the monitored scene. Since the contrast value of each block B in the newly captured images after the refocus is highly likely to be different from its predecessor one before the refocus, a new comparison basis should be made by going back to Step 110 to generate a new reference image 50 and a new stage of determination as in Step 120-160 follows up. In more detail, after the auto-focus procedure of the image capturing unit 12 is finished, a plurality of consecutive images is then captured for the processing unit 14 or the second processing unit 142 to generate a new reference image 50' accordingly, using the above mentioned steps of generating the reference image 50. The new reference image 50' now replaces the 'old' reference image 50 generated before the auto-focus procedure and a new stage of blur determination in Step 120-160 and the auto-focus procedure will proceed.

When there is some change of scene, an in-focus area or area of interest becoming blurred or changes occurring in the monitored area, during the monitoring device 10 monitoring a certain scene, with the blur detection method of the invention that responds by executing a series of steps as in Step 110-170, an focus motor of the image capturing unit 12 can be activated to auto-focus once. The image capturing unit 12 no longer needs to focus all the time but just does it when finding that the in-focus area becomes out-of-focus.

Additionally, in some embodiments, the invention may also check if the reference image 50 should be updated first before Step 110 and the following steps are carried out. In detail, the processing unit 14 or the second processing unit 142 may determine before Step 110 whether a parameter of pan, a parameter of tilt, or a parameter of zoom of the image capturing unit 12 has changed and when it does, it means that there is change of scene for the image capturing unit 12 and the original reference image 50 is no longer of reference value. Update of the reference image 50 takes place before Step 110 and following steps.

It should be noted that after Step 150, when one of the test images 60 has its determination result failing to meet the predetermined condition, and after Step 160, when the number of consecutive test images 60 determined as blurred images does not reach the predetermined amount and a non-blurred image shows up right next to them, determination may also be made to see if the reference image 50 needs to be updated. If the reference image 50 needs to be updated, Steps 120-170, as described above, are carried out after the update of the reference image 50. Otherwise, step 130 will be the next step to generate the test images 60 if there is no need to update the reference image 50.

Although the Steps 110-170 as described are carried out by the processing unit 14 or the second processing unit 142, for the monitoring system 20 as shown in FIG. 2, it may also be the case that part of the steps carried out by the first processing unit 141 and part of the steps carried out by the remote second processing unit 142. In one embodiment for example, after the first processing unit 141 of the monitoring device 22 executing Step 110 and Step 130, data is sent to the remote processing device 24 and the remote second processing unit 142 takes over to execute Step 120, Step 140, and Step 160. Jobs then gets back to the first processing unit 141 of the monitoring device 22 to execute Step 170. Not being a limitation to the invention and considering the design of the processing units and operational ability, other embodiments may have different configurations on how the first processing unit 141 and the second processing unit 142 collaborate to finish Steps 110-170 together.

The monitoring device, the monitoring system, and the blur detection method of images provided in the invention separate a monitored area into an in-focus area and an out-of-focus area, in some sense a key monitoring area and a non-key monitoring area, after focusing is done and then analyze the following captured images for how the blocks that makes up the in-focus area change in the blurriness and the proportion of the blocks with changed blurriness to overall blocks in the in-focus area. When the proportion of a captured image meets a specific condition, the captured image is then determined as a blur image. A consecutive number of determined blur images will trigger an auto focus procedure. The invention starts the auto-focus procedure only when a previously recognized in-focus area becomes blurred to a certain degree, which meets the use experience and is also capable of reducing aging of elements caused by constant focusing and instability of sharpness of images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A blur detection method of images, comprising steps:
    generating a reference image having a plurality of blocks;
    identifying a plurality of first blocks from the plurality of blocks, wherein an in-focus area is defined by the plurality of first blocks;
    generating a test image having a plurality of test blocks corresponding to the plurality of blocks of the reference image;
    identifying a plurality of second blocks from the plurality of test blocks that correspond to the plurality of first blocks in the in-focus area; and
    executing a determination procedure and generating a determination result based on information from the plurality of second blocks and the plurality of first blocks, and when the determination result meets a predetermined condition, determining the test image as a blurred image.

2. The blur detection method of claim 1, wherein the steps of identifying the plurality of first blocks and the plurality of second blocks are identifying the plurality of first blocks and the plurality of second blocks according to a first threshold value.

3. The blur detection method of claim 2, wherein identifying the plurality of first blocks according to the first threshold value is by comparing a contrast value of each block with the first threshold value to identify a plurality of blocks whose contrast values exceed the first threshold value as the plurality of first blocks.

4. The blur detection method of claim 3, wherein identifying the plurality of second blocks according to the first threshold value is by comparing the contrast values of the plurality of first blocks of the reference image and the contrast values of the plurality of test blocks that correspond to the plurality of first blocks in the in-focus area to identify a plurality of test blocks that correspond to the plurality of first blocks in the in-focus area and have different contrast values as the plurality of second blocks.

5. The blur detection method of claim 4, wherein when the number of the plurality of first blocks is M and the number of the plurality of second blocks is N, the determination procedure is dividing N by M and the determination result is a ratio of N divided by M, wherein M and N are positive integers and the predetermined condition is the ratio greater or equal to a second threshold value.

6. The blur detection method of claim 3, wherein identifying the plurality of second blocks according to the first threshold value is by comparing the contrast values of the plurality of first blocks of the reference image and the contrast values of the plurality of test blocks that correspond to the plurality of first blocks in the in-focus area to identify a plurality of test blocks that correspond to the plurality of first blocks in the in-focus area and have substantially the same contrast values as the plurality of second blocks.

7. The blur detection method of claim 6, wherein when the number of the plurality of first blocks is M and the number of the plurality of second blocks is N, the determination procedure is dividing N by M and the determination result is a ratio of N divided by M, wherein M and N are positive integers and the predetermined condition is the ratio smaller or equal to a third threshold value.

8. The blur detection method of claim 1, further comprising steps:
    generating repeatedly a plurality of test images;
    determining whether each of the plurality of test images is a blurred image; and when consecutive P test images are determined as blurred images, starting an auto-focus procedure, wherein P is a positive integer larger than 1.

9. The blur detection method of claim 8, further comprising step:
generating a new reference image after the auto-focus procedure is finished.

10. The blur detection method of claim 1, wherein the reference image and the test image are generated by using an image capturing unit capturing a scene, the blur detection method further comprising step:
determining whether the scene being captured by the image capturing unit changes and generating a new reference image after the scene changes.

11. The blur detection method of claim 1, wherein the reference image and the test image are generated by using an image capturing unit capturing a scene, the blur detection method further comprising step:
determining whether a parameter of pan, a parameter of tilt, or a parameter of zoom of the image capturing unit changes and generating a new reference image after the parameter of pan, the parameter of tilt, or the parameter of zoom of the image capturing unit changes.

12. A monitoring device, comprising an image capturing unit and a processing unit, the image capturing unit and the processing unit performing the blur detection method of claim 1.

13. A monitoring system, comprising a monitoring device having an image capturing unit and a first processing unit and comprising a remote processing device having a second processing unit, the monitoring device and the remote processing device performing the blur detection method of claim 1.

* * * * *